(12) United States Patent
Borisov et al.

(10) Patent No.: US 8,078,103 B2
(45) Date of Patent: Dec. 13, 2011

(54) MULTI-ELEMENT RFID COUPLER

(75) Inventors: Yevgeniy Borisov, Belmont, CA (US); Karl Torchalski, Arlington Heights, IL (US); Daniel F. Donato, Johnsburg, IL (US)

(73) Assignee: ZIH Corp., Hamilton (BM)

( * ) Notice: Subject to any disclaimer, the term of this patent is extended or adjusted under 35 U.S.C. 154(b) by 889 days.

(21) Appl. No.: 11/263,093

(22) Filed: Oct. 31, 2005

(65) Prior Publication Data

US 2007/0099566 A1 May 3, 2007

(51) Int. Cl.
*H04B 5/00* (2006.01)
(52) U.S. Cl. .............. 455/41.1; 340/686.4; 340/686.1; 340/572.1; 340/686.6; 235/375; 235/432; 358/1.15; 358/1.5; 358/1.12
(58) Field of Classification Search .......... 455/41.1; 340/872.1, 686.1, 572.1, 686.6, 686.4, 686.8, 340/686.7; 235/375, 432; 358/1.15, 1.5, 358/1.12
See application file for complete search history.

(56) References Cited

U.S. PATENT DOCUMENTS

| | | | |
|---|---|---|---|
| 4,486,758 A | 12/1984 | de Ronde | |
| 4,922,259 A * | 5/1990 | Hall et al. | 343/700 MS |
| 5,317,646 A | 5/1994 | Sang, Jr. et al. | |
| 5,373,266 A * | 12/1994 | Lenzing et al. | 333/116 |
| 5,519,381 A | 5/1996 | Marsh et al. | |
| 5,537,105 A | 7/1996 | Marsh et al. | |
| 5,557,280 A | 9/1996 | Marsh et al. | |
| 5,652,711 A | 7/1997 | Vennekens | |
| 5,677,629 A * | 10/1997 | Borsboom | 324/318 |
| 5,680,459 A | 10/1997 | Hook et al. | |
| 5,699,066 A | 12/1997 | Marsh et al. | |
| 5,726,630 A | 3/1998 | Marsh et al. | |
| 5,748,891 A | 5/1998 | Fleming et al. | |
| 5,898,405 A | 4/1999 | Iwasaki | |
| 5,903,239 A | 5/1999 | Takahashi et al. | |
| 5,920,287 A | 7/1999 | Belcher et al. | |
| 5,966,083 A | 10/1999 | Marsh et al. | |
| 5,983,243 A | 11/1999 | Heiney et al. | |
| 5,995,017 A | 11/1999 | Marsh et al. | |
| 5,995,046 A | 11/1999 | Belcher et al. | |
| 5,997,193 A | 12/1999 | Petterutti et al. | |

(Continued)

FOREIGN PATENT DOCUMENTS

DE 94 06 081 U1 7/1994

(Continued)

OTHER PUBLICATIONS

International Search Report for corresponding International Appl. No. PCT/US2006/042353 mailed Jan. 31, 2007.

(Continued)

*Primary Examiner* — Temesgh Ghebretinsae
*Assistant Examiner* — Erica Fleming-Hall
(74) *Attorney, Agent, or Firm* — Alston & Bird LLP

(57) ABSTRACT

An RFID communication system comprising a near field coupler that is capable of selectively communicating with a targeted transponder positioned among a group of multiple adjacent transponders. The coupler is configured to receive communication signals from a transceiver and transmit the signals to a targeted transponder in a transponder operating region. The coupler includes a number of radiating elements spaced apart and a switching element. The switching element selectively couples one or more of the radiating elements to the transceiver. The coupled elements transmit the signals into the transponder operating region by emanating a near field effect. The pattern of the near field effect may be adjusted by changing the combination of the coupled radiating elements.

14 Claims, 3 Drawing Sheets

U.S. PATENT DOCUMENTS

| | | | |
|---|---|---|---|
| 6,002,708 A | 12/1999 | Fleming et al. | |
| 6,010,257 A | 1/2000 | Petteruti et al. | |
| 6,012,083 A | 1/2000 | Savitzky et al. | |
| 6,054,925 A | 4/2000 | Proctor et al. | |
| 6,121,926 A | 9/2000 | Belcher et al. | |
| 6,127,976 A | 10/2000 | Boyd et al. | |
| 6,170,748 B1 | 1/2001 | Hash et al. | |
| 6,198,381 B1 | 3/2001 | Turner et al. | |
| 6,246,326 B1 | 6/2001 | Wiklof et al. | |
| 6,267,521 B1 * | 7/2001 | Lodwig et al. | 400/693.1 |
| 6,268,723 B1 | 7/2001 | Hash et al. | |
| 6,317,082 B1 | 11/2001 | Bacon et al. | |
| 6,349,116 B1 | 2/2002 | Hash et al. | |
| 6,366,242 B1 | 4/2002 | Boyd et al. | |
| 6,366,626 B1 | 4/2002 | Boyd | |
| 6,367,697 B1 | 4/2002 | Turner et al. | |
| 6,379,058 B1 | 4/2002 | Petteruti et al. | |
| 6,380,894 B1 | 4/2002 | Boyd et al. | |
| 6,385,268 B1 | 5/2002 | Fleming et al. | |
| 6,388,630 B1 | 5/2002 | Kruger et al. | |
| 6,392,544 B1 * | 5/2002 | Collins et al. | 340/572.7 |
| 6,393,045 B1 | 5/2002 | Belcher et al. | |
| 6,400,754 B2 | 6/2002 | Fleming et al. | |
| 6,434,194 B1 | 8/2002 | Eisenberg et al. | |
| 6,476,719 B2 | 11/2002 | Belcher et al. | |
| 6,480,143 B1 | 11/2002 | Kruger et al. | |
| 6,502,005 B1 | 12/2002 | Wrubel et al. | |
| 6,577,275 B2 | 6/2003 | Turner | |
| 6,593,885 B2 | 7/2003 | Wisherd et al. | |
| 6,650,302 B2 | 11/2003 | Sanad | |
| 6,655,582 B2 | 12/2003 | Wohl et al. | |
| 6,657,586 B2 | 12/2003 | Turner | |
| 6,661,336 B1 | 12/2003 | Atkins et al. | |
| 6,686,829 B1 | 2/2004 | Hohberger et al. | |
| 6,721,369 B1 | 4/2004 | Hash et al. | |
| 6,724,895 B1 | 4/2004 | Turner et al. | |
| 6,778,888 B2 | 8/2004 | Cataldo et al. | |
| 6,784,787 B1 | 8/2004 | Atkins et al. | |
| 6,795,491 B2 | 9/2004 | Fleming et al. | |
| 6,802,659 B2 | 10/2004 | Cremon et al. | |
| 6,812,839 B1 | 11/2004 | Belcher et al. | |
| 6,839,030 B2 * | 1/2005 | Noujeim | 343/700 MS |
| 6,848,616 B2 | 2/2005 | Tsirline et al. | |
| 6,853,687 B2 | 2/2005 | Harrington et al. | |
| 6,859,485 B2 | 2/2005 | Belcher | |
| 6,867,687 B2 | 3/2005 | Turner | |
| 6,870,460 B2 | 3/2005 | Turner et al. | |
| 6,891,466 B2 | 5/2005 | Turner et al. | |
| 6,892,054 B2 | 5/2005 | Belcher et al. | |
| 6,903,656 B1 | 6/2005 | Lee | |
| 6,908,034 B2 | 6/2005 | Alleshouse | |
| 6,954,533 B2 | 10/2005 | Turner et al. | |
| 6,958,678 B2 | 10/2005 | Hohberger et al. | |
| 6,987,744 B2 | 1/2006 | Harrington et al. | |
| 7,019,664 B2 | 3/2006 | Turner et al. | |
| 7,037,009 B2 | 5/2006 | Barrus et al. | |
| 7,046,657 B2 | 5/2006 | Harrington et al. | |
| 7,053,755 B2 | 5/2006 | Atkins et al. | |
| 7,137,000 B2 | 11/2006 | Hohberger et al. | |
| 7,142,815 B2 | 11/2006 | Desjeux et al. | |
| 7,161,469 B2 | 1/2007 | Turner et al. | |
| 7,190,270 B2 | 3/2007 | Brown et al. | |
| 7,190,271 B2 | 3/2007 | Boyd | |
| 7,212,563 B2 | 5/2007 | Boyd et al | |
| 7,218,229 B2 | 5/2007 | Boyd | |
| 7,228,433 B2 | 6/2007 | Turner et al. | |
| 7,398,054 B2 | 7/2008 | Tsirline et al. | |
| 7,398,926 B1 * | 7/2008 | Kikin et al. | 235/451 |
| 7,400,298 B2 | 7/2008 | Fogg et al. | |
| 7,441,701 B2 | 10/2008 | Beck et al. | |
| 7,467,513 B2 | 12/2008 | Sasaki et al. | |
| 7,475,814 B2 | 1/2009 | Wingo et al. | |
| 7,489,243 B2 | 2/2009 | Brown et al. | |
| 7,498,942 B2 | 3/2009 | Torchalski et al. | |
| 2001/0029857 A1 * | 10/2001 | Heredia et al. | 101/288 |
| 2003/0063001 A1 | 4/2003 | Hohberger et al. | |
| 2004/0164864 A1 | 8/2004 | Chung et al. | |
| 2004/0178267 A1 * | 9/2004 | Tsirline et al. | 235/449 |
| 2004/0195319 A1 * | 10/2004 | Forster | 235/385 |
| 2004/0249557 A1 | 12/2004 | Harrington et al. | |
| 2005/0045724 A1 | 3/2005 | Tsirline et al. | |
| 2005/0206524 A1 | 9/2005 | Forster et al. | |
| 2005/0274799 A1 | 12/2005 | Torchalski et al. | |
| 2006/0055721 A1 * | 3/2006 | Burdette et al. | 347/19 |
| 2006/0097848 A1 | 5/2006 | Davidson et al. | |
| 2006/0191022 A1 | 8/2006 | Hohberger et al. | |
| 2006/0220851 A1 | 10/2006 | Wisherd | |
| 2006/0259772 A1 | 11/2006 | Kruger et al. | |
| 2006/0279408 A1 | 12/2006 | Atkins et al. | |
| 2007/0063843 A1 | 3/2007 | Tsirline et al. | |
| 2007/0099566 A1 | 5/2007 | Borisov et al. | |
| 2007/0126558 A1 | 6/2007 | Donato | |
| 2007/0130754 A1 | 6/2007 | Fein | |
| 2007/0216591 A1 | 9/2007 | Tsirline et al. | |
| 2007/0229224 A1 | 10/2007 | O'Hagan | |
| 2007/0229227 A1 | 10/2007 | Brown | |
| 2007/0252698 A1 | 11/2007 | Turner | |
| 2007/0252728 A1 | 11/2007 | Wisherd et al. | |
| 2007/0262873 A1 | 11/2007 | Tsirline et al. | |
| 2008/0074269 A1 | 3/2008 | Torchalski | |
| 2008/0117027 A1 | 5/2008 | Tsirline et al. | |
| 2008/0238606 A1 | 10/2008 | Tsirline et al. | |
| 2008/0266055 A1 | 10/2008 | Turner et al. | |
| 2009/0008448 A1 | 1/2009 | Tsirline et al. | |

FOREIGN PATENT DOCUMENTS

| | | |
|---|---|---|
| DE | 93 21 478 U1 | 8/1998 |
| EP | 1 394 719 A1 | 3/2004 |
| WO | WO-01/35320 A1 | 5/2001 |
| WO | WO 2005/022445 | 3/2005 |

OTHER PUBLICATIONS

L.O. McMillan, N.V. Shuley and P.W. Davis; *Leaky Fields on Microstrip*; Progress in Electromagnetics Research; PIER 17; 1997; pp. 323-337.

Office Action mailed May 24, 2006 in U.S. Appl. No. 10/604,996 (now issued as USPN 7,398,054).

Response to Official Action filed Aug. 8, 2006 in U.S. Appl. No. 10/604,996 (now issued as USPN 7,398,054).

Office Action mailed Oct. 19, 2006 in U.S. Appl. No. 10/604,996 (now issued as USPN 7,398,054).

Reply filed Feb. 15, 2007 in U.S. Appl. No. 10/604,996 (now issued as USPN 7,398,054).

Office Action mailed May 21, 2007 in U.S. Appl. No. 10/604,996 (now issued as USPN 7,398,054).

Reply filed Aug. 17, 2007 in U.S. Appl. No. 10/604,996 (now issued as USPN 7,398,054).

Office Action mailed Oct. 25, 2007 in U.S. Appl. No. 10/604,996 (now issued as USPN 7,398,054).

Amendment filed Jan. 25, 2008 in U.S. Appl. No. 10/604,996 (now issued as USPN 7,398,054).

Extended European Search Report for European Patent Appl. No. 10009344.2, mailed Nov. 11, 2010.

Extended European Search Report for European Patent Appl. No. 10009341.8, mailed Nov. 11, 2010.

* cited by examiner

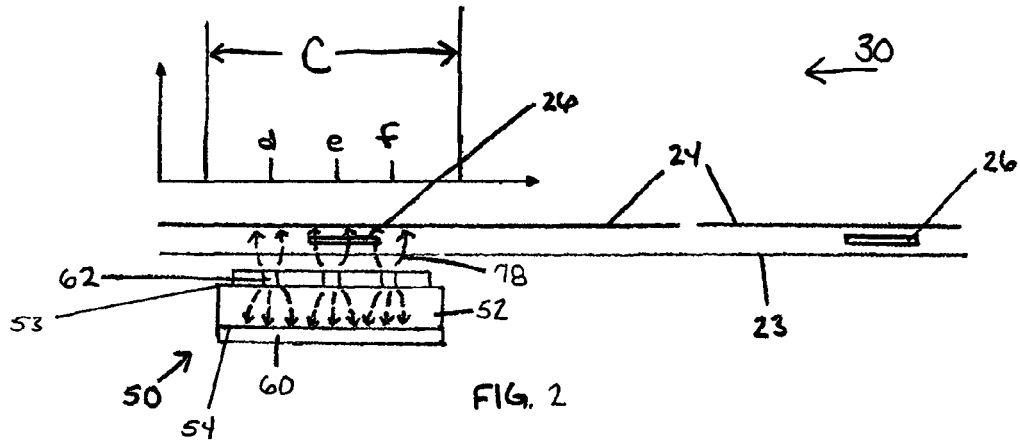
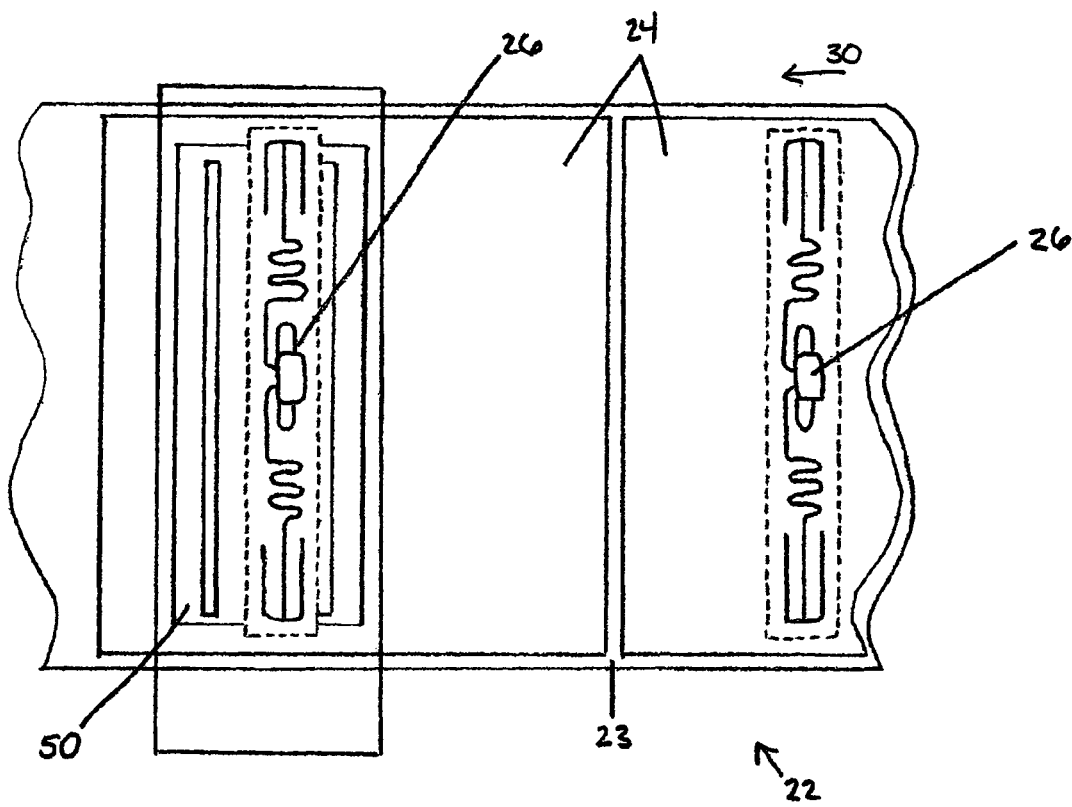

MULTI-ELEMENT RFID COUPLER

BACKGROUND OF THE INVENTION

1. Field of the Invention

The present invention relates to RFID couplers and, in particular, to UHF spatially selective couplers capable of selectively communicating with a targeted transponder from among of group of multiple adjacent transponders.

2. Description of Related Art

Radio frequency identification (RFID) transponders, either active or passive, are typically used with an RFID transceiver or similar device to communicate information from the transponders. In order to communicate, the transceiver exposes the transponder to a radio frequency (RF) electromagnetic field or signal. In the case of a passive transponder, the RF electromagnetic field energizes the transponder and thereby prompts the transponder to respond to the transceiver by modulating the field in a well-known technique called backscattering. In the case of an active transponder, the transponder may respond to the electromagnetic field by transmitting an independently powered reply signal to the transceiver.

Problems can occur when interrogating multiple adjacent transponders regardless on whether the transponders are passively or actively powered. For example, an interrogating electromagnetic signal may activate more than one transponder at a given time. This simultaneous activation of multiple transponders may lead to communication, i.e. read and write, errors because each of the multiple transponders may transmit reply signals to the transceiver at the same time.

Several anti-collision management techniques commercially exist for allowing near simultaneous communication between multiple transponders and a single transceiver while reducing communication errors. However, such anti-collision management techniques tend to increase system complexity, cost, and delay response. Furthermore, such techniques are often "blind" in that they cannot locate a given transponder or more specifically recognize the position of a transponder within the interrogating RF electromagnetic field. For example, in a printer-encoder device, the device would not know whether the transceiver was communicating with the transponder proximate to the printhead or not.

Another method of preventing multiple transponder activation is to electrically isolate transponders from one another. For example, devices or systems may employ an RF-shielded housing or anechoic chamber for shielding the adjacent transponders from the electromagnetic field. In various applications, transponders individually pass though a shielded housing for individualized exposure to an interrogating RF electromagnetic field. Unfortunately, RF-shielded housings add cost and complexity to a system. Furthermore, many devices are limited with regard to space or weight and, thus, cannot accommodate such shielded housings.

The challenge of avoiding multiple transponder activation may be especially acute in some applications. RF printer-encoders are one example. RF printer-encoders are devices capable of programming and printing a series or stream of transponders. The close proximity of the transponders, during processing, and the space, cost, and weight restrictions associated with such devices make multiple transponder activation problematic. Furthermore, the space, cost, and weight restrictions, among other factors, make anti-collision management techniques or shielding components for alleviating multiple transponder activation less than desirable.

In light of the foregoing it would be desirable to provide a RF system or device capable of interrogating individual transponders positioned among multiple adjacent transponders without the need for anti-collision management techniques or shielding components. Furthermore, it would be preferable to provide an RF communication system that adjusts to different transponder configurations and placements without increasing the broadcast range of the RF transceiver signal.

BRIEF SUMMARY OF THE INVENTION

The present invention addresses the above needs by providing a near field coupler system adapted to provide selective communication between a transceiver and a targeted transponder disposed among multiple adjacent transponders. The system includes a transceiver, a near field coupler, and a transponder conveyance system. The transceiver is adapted to transmit communication signals. The near field coupler is structured to receive the communication signals from the transceiver and further adapted to broadcast electromagnetic signals into a transponder operating region. The transponder conveyance system is adapted to position at least one transponder within the transponder operating region. The near field coupler system may further include a printhead configured to print indicia upon the at least one transponder and a controller for regulating the near field coupler based on the location of the targeted transponder in the transponder operating region.

According to one embodiment, the near field coupler includes a dielectric substrate, a terminating resistor, a ground plane, more than one radiating element, and a switching element. The dielectric substrate has a first surface, a second surface, a first end and a second end. The terminating resistor is disposed onto the dielectric substrate adjacent the second end. The ground plane is adjacent to the second surface of the dielectric substrate. The radiating elements extend proximately from the first end to the second end of the dielectric substrate along the first surface, wherein the radiating elements are connected to the ground plane through the terminating resistor. The switching element is electrically connected to the radiating elements adjacent to the first end of the dielectric substrate and is in electrical communication with the transceiver. Also, the switching element is adapted to selectively activate one or more radiating elements among the plurality of radiating elements.

The switching element may include a number of switches, including having the same number of switches or less than the number of radiating elements. At least one of the switches may be a PIN diode.

According to one embodiment, the near field coupler has three radiating elements, wherein each element is a conductive strip disposed on the first surface of the dielectric substrate. The spatial relationship between the strips may vary. For example, they may be substantially parallel to each other. The conductive strips may also be in a zig-zag configuration.

The near field coupler includes a terminating resistor, a dielectric substrate having a first side and second side, a ground plane adjacent to the first side of the dielectric substrate, a plurality of spaced radiating elements extending from a first end and a second end along the second side of the dielectric substrate. Each second end is connected to the ground plane through the terminating resistor. A switching element extends from the transceiver to the first end of each radiating element. The switching element is also configured to selectively couple at least one of the radiating elements to the transceiver based on the location of the targeted transponder to the coupler.

The switching element may include a plurality of switches. For example, the number of switches may be equal to or less than the number of radiating elements. Furthermore, each switch may include a PIN diode. According to one embodiment, the near field coupler includes three radiating elements that are substantially parallel to each other. The radiating elements may also be in a zig-zag configuration.

Another aspect of the invention is a method of tuning the near field coupler system. The method includes transmitting a communication signal from the transceiver to a near field coupler, wherein the switching element is adapted to provide selective electrical communication between the transceiver and one or more radiating elements among the plurality of radiating elements to define multiple switched radiating sets. A transponder arranged in an unknown orientation is positioned within the transponder operation region. An electromagnetic signal is broadcasted into the transponder operating region based upon the selective communication facilitated by the switching element between the transceiver and the plurality of radiating elements. A power level for each of the multiple switched radiating sets that accommodates a reliable encoding process between the transceiver and the transponder is determined. The lowest power level among the power levels for each of the multiple switched radiating sets is determined for purposes of fixing a preferred radiating set for interrogating subsequent transponders arranged in the unknown orientation. The method may also include storing the preferred radiating set for subsequent transponders arranged in the unknown orientation.

In yet another aspect of the present invention is a method of communicating with the targeted transponder. The method includes advancing the targeted transponder along a path, generating a communication signal to the near field coupler, emanating a near field effect in the proximity of the targeted transponder in order to communicate with the targeted transponder, and following the advancing targeted transponder with the near field effect by changing the combination of coupled radiating elements.

BRIEF DESCRIPTION OF THE SEVERAL VIEWS OF THE DRAWING(S)

Having thus described the present invention in general terms, reference will now be made to the accompanying drawings, which are not necessarily drawn to scale, and wherein:

FIG. 2 is a simplified cut-away side view of a near field coupler system having a coupler comprising a plurality of radiating elements structured according to one embodiment of the present invention for creating a near field effect pattern that is transmitted in to a schematically illustrated transponder operating region;

FIG. 3 is a schematic illustration of a coupler interrogating transponders disposed on a carrier substrate in accordance with one embodiment of the present invention;

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

The present invention concerns an apparatus and method for enabling an RFID transceiver (sometimes referred to as an "interrogator") to selectively communicate with a targeted transponder that is commingled among or positioned in proximity to multiple adjacent transponders. As will be apparent to one of ordinary skill in the art, various embodiments of the present invention are described below that selectively communicate with a targeted transponder without requiring physical isolation of the transponder using space-consuming shielded housings, anechoic chambers, or relatively more complex or costly anti-collision management techniques. Furthermore, the inventive concepts described herein enable RFID transceivers to adapt to differing transponder configurations, placements, or orientation within a selected transponder operating region.

Several embodiments of the present invention may be useful for reading, writing, or otherwise encoding passive transponders located on assembly lines, in inventory management centers where on-demand RFID labeling may be needed, or in other similar circumstances. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units." As will be apparent to one of ordinary skill in the art, it may be desirable to print indicia such as text, numbers, barcodes, graphics, etc., to such media units before, after, or during communications with their corresponding transponders.

The present invention has been depicted, for illustration purposes, in the context of a specific application, namely, RFID enabled printer systems, also referred to herein as "printer-encoders." Examples of printer-encoders are disclosed in commonly-owned U.S. Pat. Nos. 6,481,907 and 6,848,616, which are hereby incorporated herein by reference. However, the inventive concepts described herein are not limited to printer-encoders and may be applied to other RFID enabled systems that may benefit from the ability to selectively communicate with a targeted transponder disposed among multiple adjacent transponders.

Figure 1:
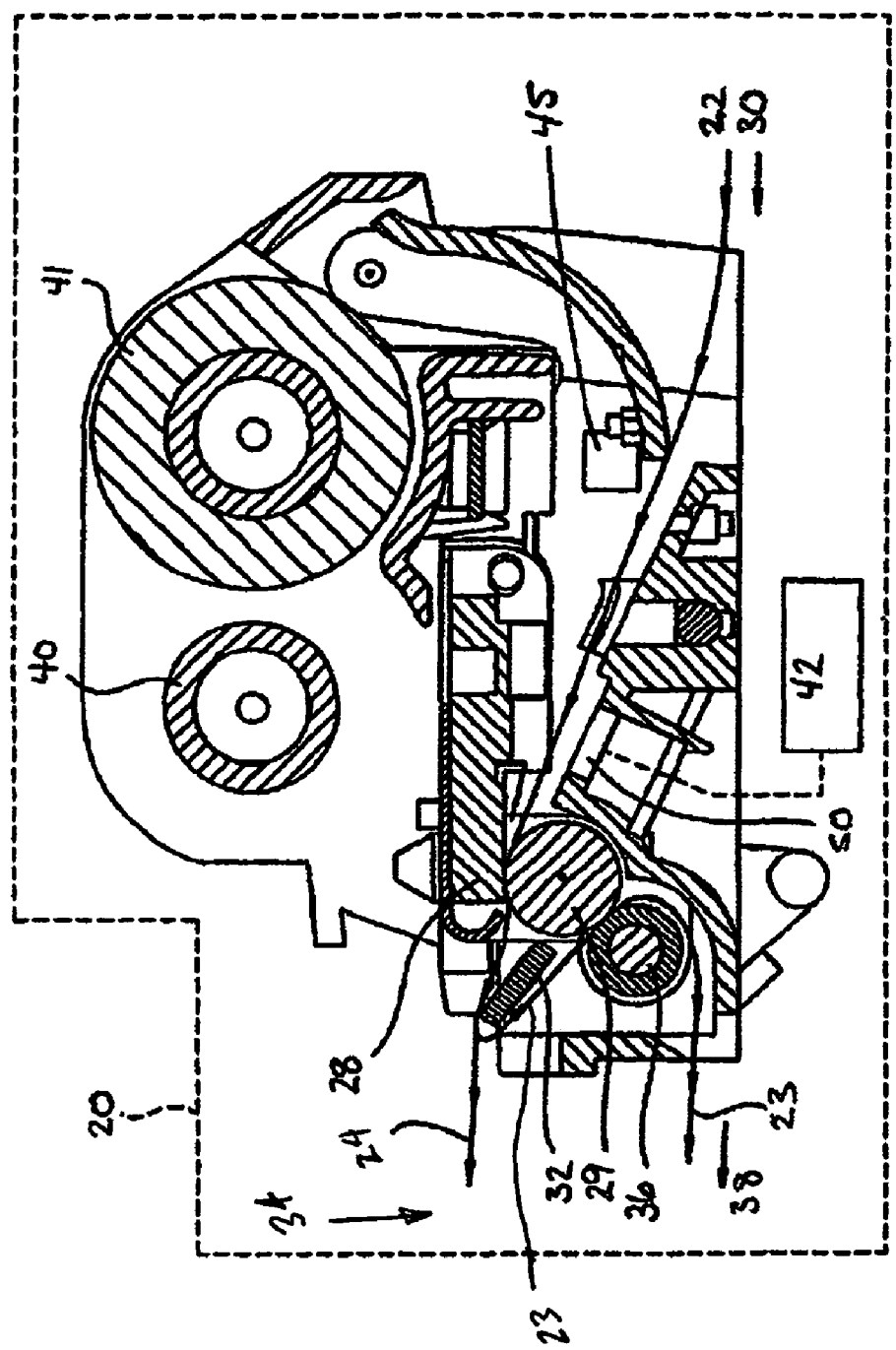
FIG. 1 is a side schematic view of a printer-encoder according to an embodiment of the present invention.

FIG. 1 illustrates an RFID printer-encoder 20 structured for printing and programming a series or stream of media units 24 according to one embodiment of the present invention. In various embodiments, as shown in FIGS. 2 and 3, at least a few of the media units 24 include transponders 26. As noted above, media units may include labels, cards, etc, that are carried by a substrate liner or web 22 as shown.

Referring back to FIG. 1, the printer-encoder 20 includes several components, such as a printhead 28, a platen roller 29, a feed path 30, a peeler bar 32, a media exit path 34, rollers 36, a carrier exit path 38, a take-up spool 40, a ribbon supply roll 41, a transceiver 42, a controller 45, and a near field coupler 50. The web 22 is directed along the feed path 30 and between the printhead 28 and the platen roller 29 for printing indicia onto the media units 24. The ribbon supply roll 41 provides a thermal ribbon (not shown for clarity) that extends along a path such that a portion of the ribbon is positioned between the printhead 28 and the media units 24. The printhead 28 heats up and presses a portion of the ribbon onto the media units 24 to print indicia. The take-up spool 40 is configured to receive and spool the used ribbon. This printing technique is commonly referred to as a thermal transfer printing. However, several other printing techniques may be used including, but not limited to, direct thermal printing, inkjet printing, dot matrix printing, and electro-photographic printing.

After printing, as shown in FIG. 1, the media unit web 22 proceeds to the media exit path 34 where the media units are typically individually removed from the web 22. For example, in one embodiment, pre-cut media units 24 may be simply peeled from the web 22 using the peeler bar 32 as shown. In other embodiments, a group of multiple media units may be peeled together and transmitted downstream to an in-line cutter for subsequent separation (not shown). Various other known media unit removal techniques may be used as will be apparent to one of ordinary skill in the art.

In applications, such as the depicted embodiment, in which the media units 24 are supported by a web 22, the web 22 may be guided out of the printer-encoder 20 along the carrier exit path 38 by rollers 36 or other devices. Techniques and structures for conveying or guiding the web of media units along the entire feed path of the printer-encoder are well known in the art and, thus, such techniques and conveyance systems are not described in great detail.

The transceiver 42 is configured for generating and transmitting RF communication signals that are broadcasted by the spatially selective microstrip near field coupler 50 located proximate the media feed path 30. For purposes of the present specification and appended claims, the transceiver 42 and the near field coupler 50 will be referred to collectively as forming at least part of a communication system. As will be explained in more detail below, the communication system transmits a near field electromagnetic signal or pattern in proximity to a transponder operating region. The communication system is configured to establish, at predetermined transceiver power levels, a mutual coupling between the transceiver and a targeted transponder of a media unit that is located in the transponder operating region. More specifically, as best illustrated in FIGS. 2 and 3, as the media web 22 proceeds along the media feed path 30 through the transponder operating region C, data may be read from and written to transponders 26 disposed on media units 24 carried by the web 22.

In general, the transceiver is a device configured to generate, process, and receive electrical communication signals. One in the art would appreciate that similar devices such as transmitters, receivers, or transmitter-receivers may be used within this invention. "Transceiver" as used in the present application and the appended claims refers to the devices noted above and to any device capable of generating, processing, or receiving electrical and/or electromagnetic signals.

Figure 4:
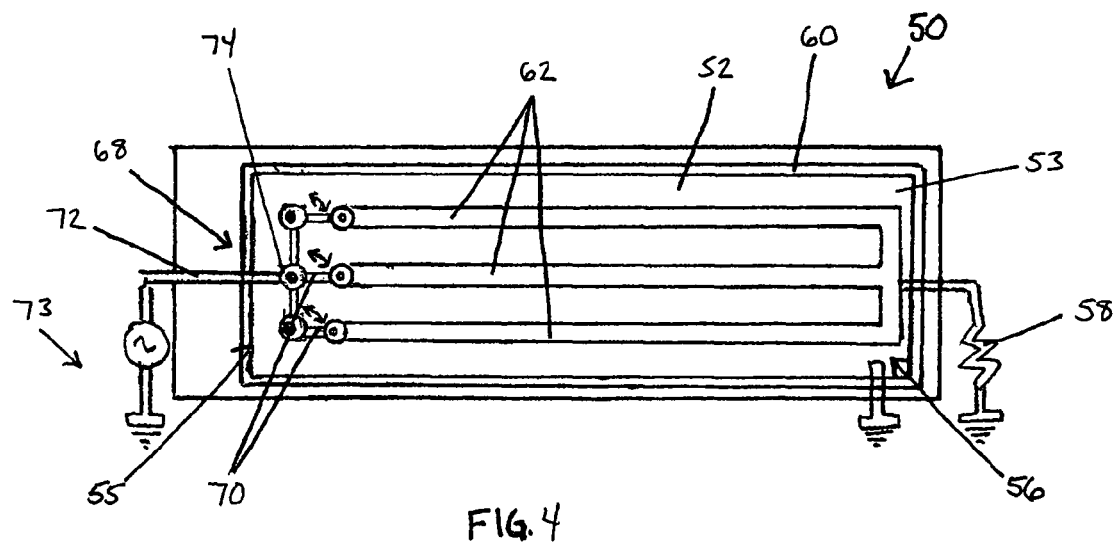
FIG. 4 is a top view of a near field coupler according to one embodiment of the present invention.
Figure 5:
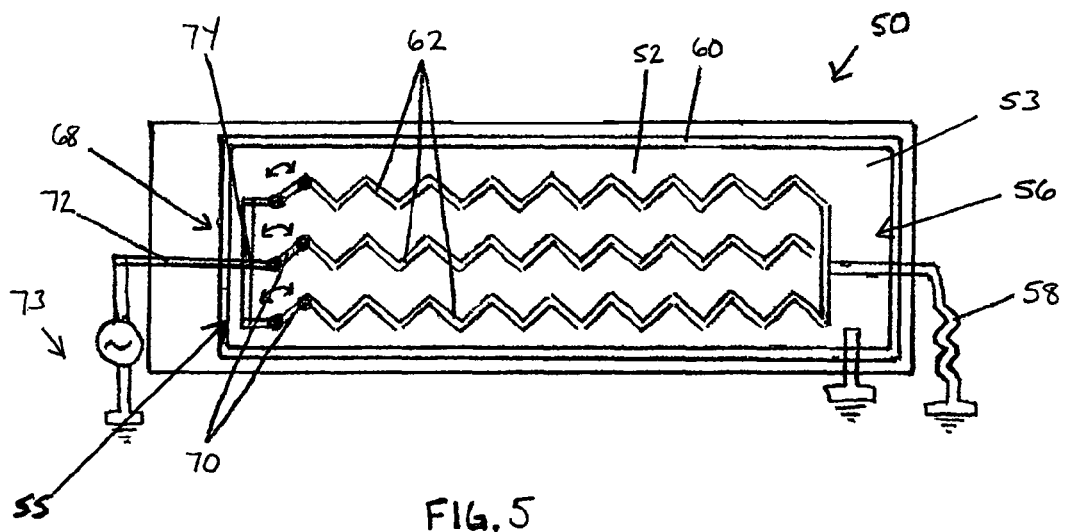
FIG. 5 is a top view of a near field coupler according to another embodiment of the present invention.

FIGS. 4 and 5 illustrate the near field coupler 50 in accordance with one embodiment of the present invention. The coupler 50 is structured in electrical communication with the transceiver (not shown in FIGS. 4 or 5) for receiving and broadcasting the signals originating from the transceiver to the targeted transponder. In the depicted embodiment, the near field coupler 50 includes a dielectric substrate 52, a terminating resistor 58, a ground plane 60, an array of radiating elements 62, and a switching element 68.

The dielectric substrate 52 has a first surface 53 and a second surface 54 (visible only in FIG. 2) opposite the first surface 53. Each surface extends from a first end 55 and a second end 56. However, the general shape of the dielectric substrate 52 may vary between applications. For example the dielectric substrate 52 may be a portion of a relatively larger printed circuit board. The dielectric substrate 52 may be made or constructed from various materials, including but not limited to, a woven glass reinforced epoxy laminate commonly referred to as "FR4" or flame resistant 4.

The array of radiating elements includes two or more radiating elements 62, wherein each radiating element 62 is structured to convert the electrical signals produced by the transceiver into an electromagnetic field. In the depicted embodiments, each radiating element 62 is comprised of a conductive strip or line disposed on the first surface 53 of the dielectric substrate 56. Each radiating element 62 generally extends from the first end 55 to the second end 56 of the dielectric substrate 52. More specifically, according to the embodiment depicted in FIG. 4, the array includes three radiating elements 62 that are generally linear and parallel to each other. Also, the radiating elements 62 may include non-linear portions. For purposes of the present specification and appended claims the term "non-linear portion" refers to a segment of a conductive line or strip having one or more turns or changes in direction. A non-linear portion may have sharply defined turns to appear as a zig-zag type structure or may have relatively smooth turns to appear as a wavy structure. Exemplary non-linear portions of the radiating elements 62 are depicted in FIG. 5. The manner of which the radiating elements 62 are deposed on the first surface 53 may vary. For example, the radiating elements may be etched, printed, or deposited onto the first surface.

The terminating resistor 58 is proximate to one end of the array of radiating elements 62 and disposed on the dielectric substrate 52. The terminating resistor 58 is connected to each radiating element 62 and the ground plane 60. The ground plane 60 is adjacent to the second and opposite surface of the dielectric substrate 52 as the radiating elements 62.

On the opposite end of the radiating elements 62 from the terminating resistor 58 is the switching element 68. The switching element 68 is configured to selectively couple and, thus, activate one or more of the radiating elements 62. As explained in further detail below, the term "activated" or "active" as used herein refers to a radiating element electrically connected to the transceiver such that the radiating element receives the signals from the transceiver and broadcasts the signals along with any other active radiating element.

In various embodiments of the present invention, the switching element 68 of the coupler 50 comprises a series of switches 70. The switching element 68, also, includes a main transmission line 72 extending from an input end 73 to a branch end 74. The input end 73 is connected to the transceiver. Extending between each radiating element 62 and the branch end 74 is a switch 74. The coupler 50 has three radiating elements 62 and one switch 64 per radiating element 62 therefor, allowing for any combination of the radiating elements 62 to be coupled or decoupled to the transceiver at one time. However, one in the art will appreciate that the number of radiating elements 62 and the number of switches 70 per element 62 may vary between embodiments. For example, the number of switches 70 may be less than the number of radiating elements 62. One in the art will appreciate the different types of switches 70 that may be used within this invention, including, but not limited to, PIN diodes.

Notably, the near field coupler 50 of the present invention, and as shown in FIGS. 4 and 5, operates as one or more one-half wavelength unmatched transmission lines, rather than operating as a standing wave radiating antenna or magnetic field generating coil. More specifically, each radiating element 62 operates as a transmission line when coupled to the transceiver, i.e. activated, by the switching element 68. In various embodiments of the present invention, each transmission line may or may not be "matched," i.e. the characteristic impedance of the transmission line may differ from that of the terminating resistor 58. For example, in one embodiment, the characteristic impedance of the transmission line may be 15 ohms and the characteristic impedance of the terminating resistor 58 may be 50 ohms. The signals generated by the transceiver pass along the one or more active radiated elements 62 of the array to the terminating resistor 58. As illustrated best in FIG. 2, these signals generate a near field effect that emanates from the edges of the one or more active radiating elements 62. The near field effect couples with the targeted transponder 26 passing through the transponder operating region C. For purposes of the present invention and appended claims the term "near field effect" refers to the one or more relatively localized electromagnetic fields 78 that are also commonly referred to as "leaky" electromagnetic fields, as further described in "Leaky Fields on Microstrip" L. O. McMillian et al. Progress in Electromagnetics Research, PIER 17, 323-337, 1997 and in commonly owned U.S. Patent Application Publication Nos. 2005/0045723 and 2005/0045724 to Tsirline et al., which are hereby incorporated by reference in their entirety. The effective range of couplers relying on such leaky electromagnetic fields 78 is limited because the fields degrade, at an exponential rate, with increasing distance from the coupler 50. This limited range reduces the likelihood that a given transceiver's signal will activate transponders outside the transponder operating region C.

As described above and as schematically illustrated in FIG. 2, each active radiating element is structured to broadcast a localized electromagnetic field 78 into the transponder operating region C. For example, as shown in FIG. 2, the three depicted radiating elements are coupled and each broadcasts an electromagnetic field at a point proximate to the corresponding radiating element 62. These points are illustrated in FIG. 2 by the lower case letters d, e, and f. One aspect of the present invention is selectively coupling and decoupling the radiating elements via the switching element to manipulate or adjust the number and location or pattern of the electromagnetic fields 78 entering into the transponder operating region C.

According to one embodiment of the present invention, the pattern of the electromagnetic fields is adjusted to correspond to the placement or orientation of the targeted transponder within the transponder operating region. For example, as discussed above, within a printer-encoder, the transponders 26 are embedded in the stream of individual media units 24, as shown in FIG. 3. However, the size and shape of the media units 24 or the placement of the transponders 26 within the media units 24 may vary depending on the media unit configuration. Increasing the range of the near field effect produced by the coupler 50 to account for such variations in the location or placement of the transponder 26 is counterproductive to the objective of limiting the range to prevent inadvertent activation of untargeted transponders 26. By altering the pattern of the near field effect, i.e. changing the locations and/or number of electromagnetic fields, the coupler 50 can accommodate different locations or orientations of the transponders 26 without necessarily increasing its range.

Also, the switching element may be configured to adjust the coupling and decoupling of the radiating elements 62 to correspond to the moving of the transponder 26 through the transponder operating region C. In other words, the near field pattern is altered such that the near field pattern is approximately centered on the transponder 26 while that transponder 26 is moving. For example, in FIG. 2, the coupler 50 may have only one active radiated element 62 at any given time. Specifically, as the transponder 26 enters the transponder operating region C, the radiating element 62 corresponding to the most upstream point, point f, is active, as the transponder 26 further proceeds the decoupling and coupling of the radiating elements 62 follows the transponder 26. Therefore, point f is deactivated by the decoupling of the corresponding radiating element 62, and point e is activated by its corresponding radiating element 62 as the transponder 26 approaches point e. Likewise, point e is deactivated and point d is activated by its corresponding radiating element 62 as the transponder 26 nears the downstream area of the transponder operating region C.

Another aspect of the present invention is a method of tuning a near field coupler for a printer-encoder to a particular media unit configuration. The method includes loading the printer-encoder 20, as shown in FIG. 1, with a web 22 of media units 24 having embedded or attached transponders 26 and advancing at least one media unit 24 to the transponder operating region C, as shown in FIG. 2. In order to properly tune the coupler to the loaded media unit's configuration, or more specifically to the orientation of the transponder within the transponder operating region, a tuning cycle is executed. As a sample media unit having a transponder is in the transponder operating region, the transceiver generates a test signal and transmits the signal through the coupler. The controller or similar device commands the switching element to execute a number of possible combinations of coupled and decoupled radiating elements. In order to determine a "preferred radiating set" of coupled and decoupled radiating elements, each combination is monitored to determine what combinations of coupled and decoupled radiating elements, referred to herein as "radiating sets," allow for a reliable encoding process for the targeted transponder. Furthermore, the controller may regulate the power level of the signal to determine what combination provides a reliable encoding process at the lowest power level. The combination that ensures a reliable encoding process at the lowest power level is determined to be the preferred radiating set for that particular media unit configuration. "Reliable encoding process" as used within this specification and the appended claims means the ability for the transceiver to effectively communicate with the targeted transponder through the near field effect created by the coupled radiating elements, while minimizing inadvertent communication with untargeted transponders.

Once the preferred radiating set is known, that radiating set is set for that media unit configuration and the printer-encoder proceeds with the normal processing and programming of the media units. The timing or frequency of executing a tuning cycle may vary. For example, once the preferred radiating set is known for a particular media unit configuration that preferred radiating set may be stored within the printer-encoder. When that particular media unit configuration is used, an operator may be able to enter that configuration into the printer-encoder through a keypad (not shown) allowing the controller to set the preferred combination without re-executing a tuning cycle. Also, the controller may be programmed to run a tuning cycle after a certain event such as the turning on of the printer-encoder, the loading of media units, the passage of certain amount of time, or after predetermined number of media units are processed.

The present invention provides a near field coupler having a limited range so as to minimize possible multiple activation of adjacent transponders outside the transponder operating region. The switching element allows for the altering of the near field effect pattern to adjust for a number of media unit configurations without necessarily increasing the range of the coupler. The tuning cycle optimizes or tunes the coupler's radiating elements to provide a reliable encoding process at a relatively low power level.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A near field coupler comprising:
   a dielectric substrate having a first surface, a second surface, a first end and a second end;
   a terminating resistor disposed on the dielectric substrate adjacent the second end;
   a ground plane adjacent to the second surface of the dielectric substrate,
   a plurality of radiating elements extending proximately from the first end to the second end of the dielectric substrate along the first surface, wherein each of the plurality of radiating elements has a length of one-half wavelength or integer multiple thereof and is connected to the ground plane through the terminating resistor such that each of the plurality of radiating elements and the ground plane together form a one-half wavelength or integer multiple thereof transmission line, the terminating resistor is selected such that the near field coupler operates as one or more unmatched transmission lines; and
   a switching element electrically connected to the plurality of radiating elements adjacent to the first end of the dielectric substrate, wherein the switching element is provided in electrical communication with the transceiver and configured to selectively deactivate one or more radiating elements among the plurality of radiating elements by decoupling from the one or more radiating elements such that a near field effect is produced by the near field coupler in an operating region, the near field effect moving within the operating region and following the advancement of a targeted transponder.

2. The near field coupler according to claim 1, wherein the switching element is comprised of a plurality of switches and wherein the number of switches is equal to or less than the number of radiating elements.

3. The near field coupler according to claim 2, wherein at least one of the plurality of switches is a PIN diode.

4. The near field coupler according to claim 1, wherein the plurality of radiating elements includes three radiating elements and each radiating element is a conductive strip disposed on the first surface of the dielectric substrate.

5. The near field coupler according to claim 1, wherein the plurality of radiating elements are parallel to each other.

6. The near field coupler according to claim 1, wherein the plurality of radiating elements are in a zig-zag configuration.

7. A near field coupler system adapted to provide selective communication between a transceiver and a targeted transponder disposed among multiple adjacent transponders, the near field coupler system comprising:
   a transceiver configured to transmit communication signals;
   a near field coupler structured to receive the communication signals from the transceiver and further configured to broadcast electromagnetic signals as a near field effect into at least a portion of a transponder operating region, the near field coupler comprising:
      a plurality of radiating elements, and
      a switching element electrically connected to the plurality of radiating elements and the transceiver, wherein the switching element is configured to selectively deactivate one or more of the radiating elements among the plurality of radiating elements, by decoupling from the one or more of the radiating elements, to adjust a pattern of the near field effect in the transponder operating region;
   a transponder conveyance configured to advance at least one transponder on a path through the transponder operating region; and
   a controller configured to control the near field coupler such that the pattern of the near field effect follows the advancement of the at least one transponder within the transponder operating region by operating the switching element based on at least one of an orientation and a location of the transponder within the transponder operating region.

8. The near field coupler system according to claim 7, wherein the switching element is comprised of a plurality of switches and wherein the number of switches is equal to or less than the number of radiating elements.

9. The near field coupler system according to claim 7, further comprising a printhead configured to print indicia upon the at least one transponder.

10. The near field coupler system according to claim 7, wherein the near field coupler further includes a dielectric substrate and each of the radiating elements comprised of a conductive strip disposed on the dielectric substrate.

11. The near field coupler system according to claim 10, wherein the conductive strips are parallel to each other.

12. The near field coupler system according to claim 11, wherein the conductive strips are in a zig-zag configuration.

13. A method of communicating with a targeted transponder, the method comprising:
   advancing the targeted transponder along a path;
   generating a communication signal to a near field coupler having a plurality of radiating elements and a switching element for selectively deactivating at least one of the radiating elements by decoupling from the at least one of the radiating elements;
   emanating, into at least a portion of a transponder operating region, a near field effect from a combination of activated radiating elements in the proximity of the targeted transponder in order to communicate with the targeted transponder; and
   following the advancement of the targeted transponder with the near field effect, the near field effect moving within the transponder operating region by changing the combination of activated radiating elements via operation of the switching element based on at least one of an orientation and a location of the targeted transponder within the transponder operating region.

14. The method according to claim 13, wherein at least one of the combinations of activated radiating elements includes one activated radiating element.

* * * * *